June 27, 1944.  G. T. McCLURE  2,352,277
FLUID PRESSURE BRAKE
Filed Sept. 29, 1942
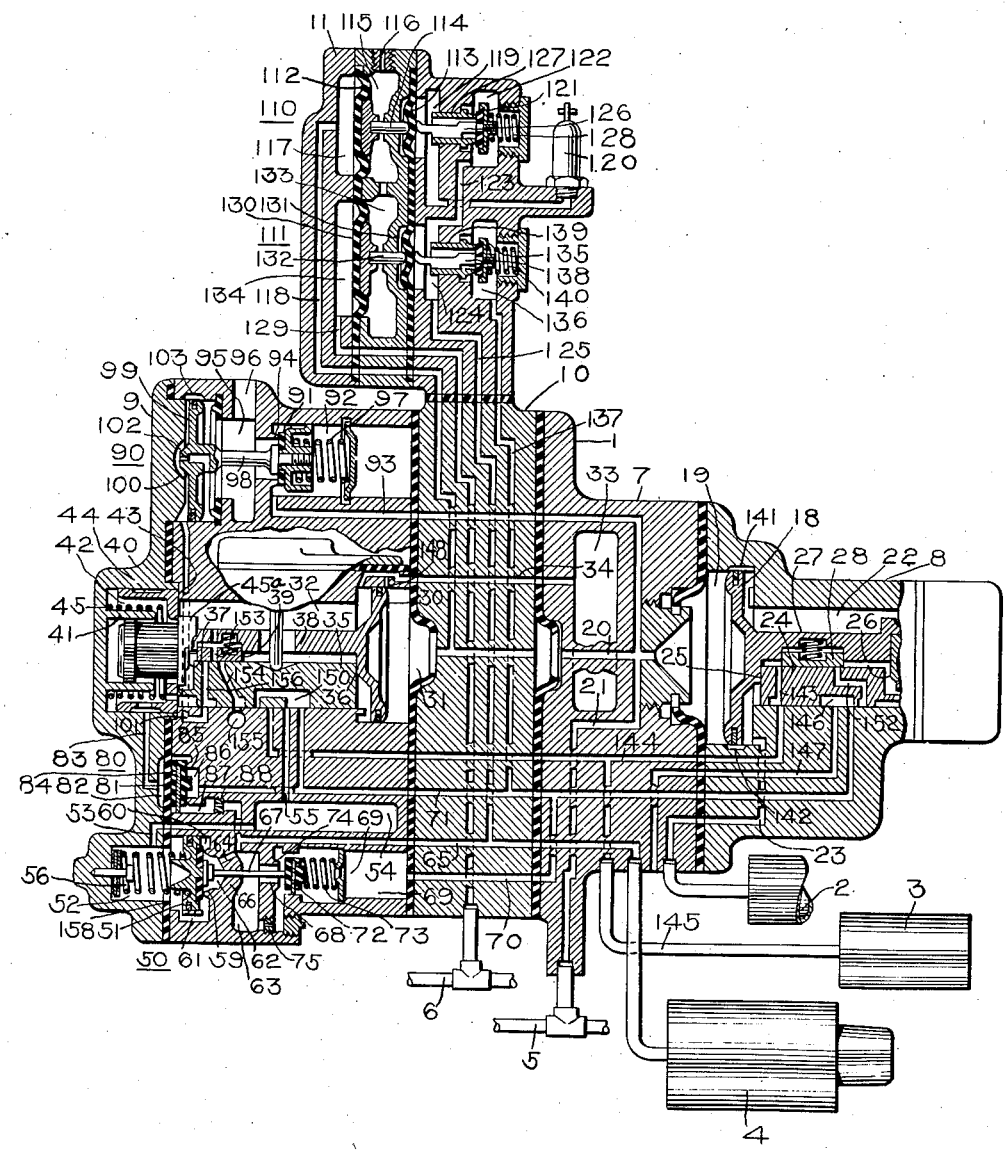
INVENTOR
Glenn T. McClure
BY
A. M. Higgins
ATTORNEY Patented June 27, 1944

2,352,277

UNITED STATES PATENT OFFICE 2,352,277

FLUID PRESSURE BRAKE

Glenn T. McClure, McKeesport, Pa., assignor to The Westinghouse Air Brake Company, Wilmerding, Pa., a corporation of Pennsylvania Application September 29, 1942, Serial No. 460,045

12 Claims. (Cl. 303—23)

This invention relates to fluid pressure brakes and more particularly to the automatic type controlled by variations in pressure in a brake pipe.

The well known "AB" brake disclosed in Patent No. 2,031,213, issued on February 18, 1936, to Clyde C. Farmer was designed for controlling the brakes on long freight trains. In such trains there is a relatively great amount of slack which must be gathered gently at the time an emergency application of the brakes is effected in order to prevent the development of damaging shocks between cars in the train. To accomplish this end, the "AB" brake was, therefore, provided with what is known as a brake cylinder build-up control mechanism, which upon an emergency reduction in brake pipe pressure operates initially to provide a limited inshot of fluid pressure to the brake cylinder device on the cars in a train to start the slack in the train to gather. The inshot valve mechanism then operates to supply fluid under pressure to the brake cylinder device at a relatively slow rate to insure the gentle gathering of the slack, and finally, said mechanism operates to provide a more rapid flow of fluid under pressure to the brake cylinder device to the full emergency degree to bring the train to a stop.

Certain cars equipped with the "AB" brake, initially intended only for long freight train service, are however required to operate in relatively short and high speed freight or express train service in which slack is not a limiting factor in emergency, so that an emergency application of brakes may be effected on such trains without the delay required in long freight train service, as is desirable to bring any train to a stop as rapidly as possible in case of emergency.

Brake equipments for both long freight train service and for short train high speed service are designed to operate on the same pressure ratio basis, i. e., to provide equalization of the pressure of fluid in the auxiliary reservoir into the brake cylinder device at 50 pounds upon a full service reduction in brake pipe pressure of twenty pounds from a normal seventy pounds which is the common standard employed in freight service. However, in short high speed trains the normal brake pipe pressure carried is usually one hundred ten pounds and equalization of such a pressure in the auxiliary reservoir into the brake cylinder device would provide an excessive brake cylinder pressure for a full service application of brakes in that it might cause sliding of wheels. A safety valve device has therefore been heretofore employed on brake equipment used in high speed train service to limit the maximum pressure obtainable in the brake cylinder device upon a service reduction in brake pipe pressure to a degree such as sixty pounds which under all normal conditions would avoid sliding of wheels. In effecting an emergency application of brakes the safety valve device is however cut out or rendered ineffective so as to thereby attain the high emergency pressure in the brake cylinder device desired to ensure prompt stopping of high speed trains.

One object of the invention is therefore the provision of an improved and relatively simple means arranged to be associated with an "AB" brake to provide in short high speed train service a rapid emergency application of brakes and including a safety valve device for limiting a service application of brakes to the usual full service degree in such use, said means and safety valve device being ineffective in long freight train service so that in such service the "AB" brake will operate in the usual manner.

Cars for use in short high speed service are provided with a signal pipe arranged to be connected through the train and to be normally charged with fluid under pressure. Long freight trains are not so equipped.

Another object of the invention is therefore the provision of means such as defined in the above object which is arranged to be controlled from a signal pipe and to be adjusted when the signal pipe is void of fluid under pressure, as in long freight train operation, to render the brake cylinder build-up control mechanism of the "AB" brake effective to delay an emergency application of brakes as required in such service, and which is adjustable by fluid pressure acting in the signal pipe in short high speed train service to render said mechanism ineffective so as to provide for obtaining the desired relatively rapid emergency application of brakes.

Other objects and advantages will be apparent from the following more detailed description of the invention.

In the accompanying drawing the single figure is a diagrammatic view of a fluid pressure brake equipment embodying the invention.

Description

As shown in the drawing, the brake equipment comprises a brake controlling valve device 1, an auxiliary reservoir 2, an emergency reservoir 3, a brake cylinder device 4, a brake pipe 5 and a signal pipe 6.

The brake controlling valve device 1 comprises a pipe bracket 7, a service application valve device 8 mounted on one face of said bracket, and an emergency valve device 9 arranged for mounting on an opposite face of said bracket. According to the invention the emergency valve device is however spaced from the bracket 7 by a filler member 10 which is mounted on the opposite face of said bracket and carries the emergency valve device 9. The brake equipment further comprises a changeover valve device 11 mounted on the filler member 10.

The service and emergency valve devices 8 and 9 and the pipe bracket 7 may be identical in all respects to the corresponding parts of the "AB" brake fully disclosed in the Farmer patent aforementioned, although in the present application only those parts of said brake are shown and will hereinafter be described which are deemed essential to an understanding of the invention. The filler member 10 is provided with suitable through passages connecting corresponding passages in the pipe bracket 7 and emergency valve device 9 in order that the emergency valve device will operate in the usual manner.

The service application valve device 8 comprises a casing containing a piston 18 having at its face adjacent the pipe bracket 7 a chamber 19 in constant communication with the brake pipe 5 through passages 20 and 21. At the opposite side of piston 18 is a valve chamber 22 in constant communication with the auxiliary reservoir 2 through a passage and pipe 23. In chamber 22 there is a main slide valve 24 mounted between two spaced shoulders 25 and 26 provided on a stem 27 associated with the piston 18. An auxiliary slide valve 28 is mounted to slide on the main slide valve 24 and is disposed in a recess provided in the piston stem 27 for movement with said stem.

The emergency valve device 9 comprises a casing containing a piston 30 having at the face adjacent the filler member 10 a chamber 31 which is in constant communication with the brake pipe through passages 20 and 21. At the opposite side of the piston 30 is a valve chamber 32 in constant communication with a quick action chamber 33 in the pipe bracket 7 through a passage 34 extending through the filler member 10. The valve chamber 32 contains a main slide valve 35 which is loosely mounted between two spaced shoulders 36 and 37 provided on a stem 38 projecting from the piston 30. An auxiliary slide valve 39 is disposed in a recess in the piston stem 38 for movement therewith and is mounted to slide on the main slide valve 35.

The left-hand end of chamber 32 is closed by a cover 40 having a sleeve like projection 41 in axial relation to piston 30 and in which the end of piston stem 38 is mounted to slide. Encircling this extension is an annular chamber 42 of greater diameter than chamber 32 in order to provide at their meeting ends an annular shoulder 43. A plunger 44 is slidably mounted in chamber 42 and is urged by a spring 45 also in said chamber into engagement with the shoulder 43. The piston stem 38 loosely extends through the plunger 44 and is provided with a shoulder 45a for engaging said plunger to define the normal release positions of the piston 30 and slide valves 35 and 39 with the plunger 44 in contact with the shoulder 43. Other functions of the plunger 44 and spring 45 are not pertinent to the invention and further description thereof will therefore be omitted.

Associated with the emergency valve device 9 is an emergency delay valve mechanism 50 which comprises a piston 51 slidably mounted in a bore the outer end of which is closed by cover 40. At the left-hand side of piston 51 is a chamber 52 connected by a passage 53 with a chamber 54 which in turn is connected by a passage 55 to the seat of the emergency main slide valve 35. The chamber 52 contains a spring 56 which acts on the piston 51 for urging same in the direction of the right-hand into engagement with an annular seat rib 59. With the piston 51 engaging the seat rib 59 a chamber 60 formed around said rib is open through a passage 61 to chamber 52. Within the seat rib 59 is a chamber 62 in constant communication with a chamber 63 through a passage 64. The chamber 63 is in constant communication with the brake cylinder device 4 through a passage and pipe 65.

The chambers 62 and 63 are separated by a wall 66 through which the passage 64 extends. A stem 67 having one end connected to the piston 51 extends through a bore in the wall 66 and through chamber 63 and a relatively large opening 68 into a chamber 69 which is connected by a passage 70 to a brake application and release passage 71 one end of which terminates at the seat of the service slide valve 24 and which is also connected to the seat of the main emergency slide valve 35. In chamber 69 the stem 67 engages a check valve 72 and is operative to unseat same from an annular seat rib 74 encircling the adjacent end of passage 68 with piston 51 in contact seat rib 59. A spring 73 in chamber 69 is operative upon movement of piston 51 away from seat rib 59 to urge the check valve 72 into sealing contact with the seat rib 74. The chambers 63 and 69 are constantly connected through a relatively restricted port 75.

The emergency valve device also comprises a timing valve device 80 which embodies a flexible diaphragm 81 clamped between the cover 40 and the casing and having at one side a chamber 82 which is in constant communication with the emergency valve chamber 32 by way of a passage 83 and chamber 42 containing the plunger 44. A check valve 84 is associated with the opposite side of the diaphragm 81 and is adapted to be urged by the diaphragm under the influence of fluid pressure in chamber 82 into contact with an annular seat rib 85. Within the seat rib 85 is a chamber 86 in constant communication with the brake application and release passage 71 while encircling said rib is a chamber 87 which is open through a choke 88 to the brake cylinder passage 65. Under a condition to be later described the diaphragm 81 is adapted to deflect in the direction of the left-hand to provide for movement of check valve 84 out of contact with seat rib 85 for establishing communication between the application and release passage 71 and the brake cylinder passage 65.

The emergency valve device also embodies a brake pipe vent valve device 90 which comprises a valve piston 91 contained in a chamber 92 which is open to the brake pipe 5 through passages 93 and 21. One side of this valve piston is arranged to cooperate with an annular seat rib 94 for closing communication between the brake pipe chamber 92 and a chamber 95 which is open to the atmosphere through a passage 96. A spring 97 in chamber 92 acts on the valve piston 91 for urging same into seating contact with the seat rib 94. The valve piston 91 is connected by a stem 98 to a piston 99 one side of which is subject to atmospheric pressure in chamber 95 while at the opposite side is a chamber 100 connected by a passage 101 to the seat of the main emergency slide valve 35. The piston 99 is provided with a choked release port 102 connecting chamber 101 to chamber 95 and there is also a leakage groove 103 provided in the wall of the bore in which the piston operates for connecting said chambers when the piston is in its normal position shown.

As above mentioned the filler member 10 is inserted between the pipe bracket 7 and emergency valve device 9 and carries the changeover valve device 11 which embodies the invention. The changeover valve device 11 comprises a brake cylinder pressure limiting valve device 110 and quick application valve device 111.

The limiting valve device 110 comprises two oppositely disposed flexible diaphragms 112 and 113 which are operatively connected together by a strut 114. The diaphragm 112 is of greater area than diaphragm 113 and between the diaphragms is a chamber 115 which is in constant communication with the atmosphere through a restricted port 116. At the opposite side of diaphragm 112 is a chamber 117 which is in constant communication with brake pipe 5 by way of a passage 118 extending into the filler member 10 where it is connected with the passage connecting passage 20 to the emergency valve piston chamber 31. At the opposite side of diaphragm 113 is a chamber 119 which is connected to a safety valve device 120. This safety valve device is adjusted to limit the degree of pressure obtained in the brake cylinder device 4 upon a full service reduction in pressure in brake pipe 5 when a car provided with this equipment is operating in short high speed train service in which the normal brake pipe pressure is usually one hundred ten pounds.

The limiting valve device 110 further comprises a check valve 121 contained in a chamber 122 which is connected by a passage 123, a chamber 124 and a passage 125 extending through the filler member 10 to the brake cylinder passage 65. This check valve has a fluted stem 126 slidably mounted in a bushing 127 provided through a wall separating chambers 119 and 122; said check valve and stem being arranged in coaxial relation with the diaphragm 113 with the end of said stem engaging said diaphragm. A spring 128 acting on the check valve 121 is provided for urging same into sealing engagement with one end of the bushing 127 for closing communication between chamber 122 and chamber 119. Deflection of the diaphragms 112 and 113 in the direction of the right-hand is arranged to unseat check valve 121 from the end of bushing 127 to thereby open chamber 122 to chamber 119.

The quick application valve device 111 comprises two flexible diaphragms 130 and 131 arranged in coaxial relation and operatively connected together by strut 132. The diaphragm 130 is of greater area than diaphragm 131 and between these diaphragms is a chamber 133 which is open to the atmosphere by way of chamber 115 and port 116. At the opposite face of diaphragm 130 is a chamber 134 which is connected through a passage 129 in the filler member 10 to the signal pipe 6. At the opposite side of diaphragm 131 is the chamber 124 which is open to the brake cylinder device 4 by way of passage 125.

The quick application valve device 111 further comprises a check valve 135 contained in a chamber 136 which is connected by a passage 137 in the filler member to the application and release passage 71. The check valve 135 has a fluted stem 138 slidably mounted in a bushing 139 which is secured in a bore through a wall separating chambers 136 and 124. The check valve 135 and stem 138 are arranged in coaxial relation with diaphragm 131 and the end of said stem engages the diaphragm. A spring 140 in chamber 136 acts on the check valve 135 for urging same into sealing contact with the adjacent end of bushing 139. Deflection of the diaphragms 130 and 131 in the direction of the right-hand is arranged to unseat the check valve 135 from the end of bushing 139.

Operation

If a car provided with this equipment is coupled into a long freight train which, as well known, is not provided with a signal pipe, the signal pipe 6 on the car will be void of fluid under pressure and chamber 134 at one side of the diaphragm 130 in the quick application valve device 111 will therefore be open to atmosphere. Under this condition spring 140 will maintain the check valve 135 seated against the end of bushing 139. The brake equipment on the car will then operate to control the car brakes in harmony with the control of brakes on all other cars in the long freight train in the same manner as described in the aforementioned Farmer patent, but which will now be briefly set forth.

Long freight train—initial charging

To initially charge the brake equipment fluid under pressure is supplied to the brake pipe 5 in the usual manner and flows therefrom through passages 21 and 26 to the service piston chamber 19 and emergency piston chamber 31 and also from passage 20 through passage 93 to the vent valve chamber 92.

With the parts of the service application valve device 8 in their normal release positions shown in the drawing, fluid under pressure supplied to chamber 19 will flow around the piston 18 through feed grooves 141 and 142 to valve chamber 22 and thence through passage 23 to the auxiliary reservoir 2 and also from said valve chamber through a port 143 in the main slide valve 24 to a passage 144 and thence through a passage and pipe 145 to the emergency reservoir 3, whereby said valve chamber and reservoirs will become charged with fluid at the pressure supplied to the brake pipe.

In this release position of the main service slide valve 24 the brake cylinder device 4 is open to the atmosphere through passage 65, chamber 63 in the delay valve mechanism 50, past the check valve 72 to chamber 69 and thence through passages 70 and 71, a release cavity 146 in the main service slide valve 24 and passage 147 which leads to the atmosphere.

With the parts of the emergency valve device in their normal release position shown fluid under pressure supplied from the brake pipe to piston chamber 31 will flow therefrom through a restricted feed port 148 to passage 34 and through said passage in one direction to the emergency valve chamber 32 and in the opposite direction to the quick action chamber 33 to thereby charge said chambers with fluid at the pressure supplied to the brake pipe.

With the main emergency slide valve 35 in its normal position shown, passage 101 is connected to a port 156 in said slide valve which leads to the seat of the auxiliary slide valve 39 where it is lapped or closed. Under this condition chamber 100 at the left-hand side of the vent valve piston 99 will be at atmospheric pressure due to the connection through port 102 and groove 103 with chamber 95 which is open to the atmosphere. As a result, spring 97 will hold the vent valve 91 seated against rib 94 so that chamber 92 will also be charged with fluid at brake pipe pressure.

Chamber 117 in the limiting valve device 110 will also be charged with fluid at brake pipe pressure due to the connection with the brake pipe through passages 118, 20, and 21 and as a result the diaphragms 112 and 113 will be deflected toward the right-hand for holding the check valve 121 unseated from the end of bushing 127. This, however, is of no consequence in long freight train operation where the normal brake pipe pressure carried is seventy pounds, as will be seen from the description to follow.

With the main emergency slide valve 35 in its normal position shown, a cavity 150 therein connects passage 55 to the brake application and release passage 71 which is open to the atmosphere through the service slide valve 24, as above described. As a result, chamber 54 and thereby chamber 52 at the left-hand side of the emergency delay valve piston 51 will both be at atmospheric pressure and since chamber 62 at the opposite side of said piston is open to the atmosphere along with the brake cylinder device 4, spring 56 will be effective to hold the piston 51 in engagement with seat rib 59 to thereby position stem 67 for holding the check valve 72 out of contact with the seat rib 74. Chamber 86 at one side of the timing valve diaphragm 81 is at this time open to the atmosphere through the application and release passage 71 and thence by way of the service slide valve 24, while chamber 87 encircling said rib is also open to the atmosphere at this time by way of port 88 and passage 65 along with the brake cylinder device 4. As a result, the pressure of fluid from the emergency valve chamber 32 effective in chamber 82 on the opposite side of the timing valve diaphragm 81 will hold the check valve 84 in sealing engagement with the seat rib 85 to thereby close communication between chambers 86 and 87 within and around, respectively, the seat rib 85.

*Long freight train—service application of brakes*

With the equipment fully charged as just described, if the engineer desires to effect a service application of the brakes, he will effect a service reduction in the pressure in brake pipe 5, in the usual well known manner. The pressure of fluid in piston chamber 19 of the service application valve device 8 will then reduce at a service rate along with the reduction in pressure in brake pipe 5 and since this rate is in excess of that at which auxiliary reservoir pressure in valve chamber 22 can reduce by flow back to chamber 19 through feed grooves 141 and 142, a differential of pressures will be created on the piston 18 which will effect movement thereof to its service application position defined by contact between said piston and the left-hand end of the bore in which the piston operates.

As the service piston 18 is thus moved in the direction of its application position it initially moves the auxiliary slide valve 28 relative to the main slide valve 24 for closing communication between the emergency reservoir charging port 143 and valve chamber 22 and for opening communication between said valve chamber and a service application port 152 provided in the main slide valve 24. At substantially the time the service port 143 is thus opened to the valve chamber 22, the shoulder 26 on the piston stem 27 engages the end of the main slide valve 24 whereby further movement of the piston to its service position will move said main slide valve to its service position in which the service port 152 registers with the brake application and release passage 71.

Fluid under pressure will then flow from valve chamber 22 and thereby the connected auxiliary reservoir 2 to the application and release passage 71 and thence through passage 70 to check valve chamber 69 in the delay valve device 50 and also to the seat of the main emergency slide valve 35. With the slide valve 35 in its normal position shown, in which it will remain during a service application of brakes, the cavity 150 connects the passage 71 to passage 55 so that fluid supplied to passage 71 will flow to chamber 54 and thence through passage 53 to chamber 52 at the left-hand side of the delay valve piston 51. At the same time this occurs, fluid under pressure supplied to the check valve chamber 69 will flow past the check valve 72 to chamber 63 and thence through passage 64 to chamber 62. The fluid pressures thus acting on the opposite sides of piston 51 will be balanced so that spring 56 will under this condition maintain the piston in its right-hand position shown and thereby maintain the check valve 72 in its unseated condition also shown. The fluid under pressure supplied from the auxiliary reservoir to the check valve chamber 69 will therefore flow past the check valve 72 through the relatively large opening 68 to chamber 63 and thence through passage 65 to the brake cylinder device 4 for effecting a service application of the brakes on the car.

Fluid under pressure will thus continue to flow from the auxiliary reservoir to the brake cylinder device 4 until the auxiliary reservoir pressure in valve chamber 22 becomes reduced to a degree slightly lower than the reduced brake pipe pressure effective in piston chamber 19, if the reduction in brake pipe pressure is less than a full service reduction, and the piston 18 will then be moved by brake pipe pressure toward the right hand relative to the main slide valve 24 for shifting the auxiliary slide valve 28 to a lap position for closing communication between valve chamber 22 and the service application passage 152 in the main slide valve 24.

The degree of pressure obtained in the brake cylinder device 4 will thus be limited in accordance with the degree of service reduction in brake pipe pressure effective in piston chamber 19. If less than a full service reduction in brake pipe pressure is effected, a further reduction will cause operation of piston 18 and auxiliary slide valve 28 to provide a corresponding increase in pressure in the brake cylinder device in the usual manner and as above described. The maximum brake cylinder pressure is, however, obtained upon a full service reduction in brake pipe pressure, which in long freight train service will be a 20 pound reduction from a normal 70 pounds pressure in the brake pipe, and upon such a reduction in brake pipe pressure the pressure in the auxiliary reservoir 2 will equalize into the brake cylinder device 4 at the full service degree of substantially 50 pounds.

Due to the fact that check valve 121 in the limiting valve device 110 of the changeover valve device 11 is unseated by brake pipe pressure acting on diaphragm 112 the brake cylinder device 4 will be connected to the safety valve device 120, but this is immaterial in long freight train service since the safety valve device is set to limit the brake cylinder pressure obtained upon a full service reduction in brake pipe pressure in short high speed train service, and this setting is in excess of the maximum service pressure obtained in the brake cylinder device in long freight train operation.

Upon a service reduction in brake pipe pressure in piston chamber 31 of the emergency valve device, the emergency piston 30 will move toward the right-hand to shift the auxiliary slide valve 39 relative to the main slide valve 35 to a position in which a port 153 in the auxiliary slide valve registers with a port 154 in the main slide valve, the port 154 in turn registering with an atmospheric vent port 155 with the main slide valve in its normal position shown. Through this communication fluid under pressure will flow from the valve chamber 32 and quick action chamber 33 at the same rate as the service rate of reduction in brake pipe pressure in piston chamber 31 whereby movement of the piston will be stopped without shifting the main slide valve 35. When the pressure in valve chamber 32 and quick action chamber 33 is thus reduced to a degree slightly below the brake pipe pressure effective in piston chamber 31, the emergency piston 30 will be moved toward the left-hand and thereby shift the auxiliary slide valve 39 back to its normal position shown for closing communication between port 153 therein and port 154 in the main slide valve to thereby limit the reduction in pressure in said chamber to substantially the same degree as obtained in the brake pipe. In other words, upon a service reduction in brake pipe pressure the emergency valve device will operate only to reduce the pressure in the valve chamber 32 and quick action chamber 33, in accordance with the reduction in the brake pipe pressure.

*Long train operation—release of brakes after a service application*

To effect a release of brakes after a service application, fluid under pressure is again supplied to the brake pipe 5 to restore the brake pipe pressure to the normal degree. The consequent increase in pressure in the service piston chamber 19 will move the service piston 18 and thereby the slide valves 24 and 28 back to their normal positions shown in which the auxiliary reservoir 2 and emergency reservoir 3 will be recharged with fluid under pressure from the brake pipe and the brake cylinder device 4 will be opened to the atmosphere for effecting a release of brakes, as above described in connection with initial charging of the equipment. In the emergency valve device the increase in brake pipe pressure in piston chamber 31 provides for the pressure in valve chamber 32 and quick action chamber 33 being restored to the normal degree by way of port 148.

*Long freight train operation—emergency application of brakes*

If the engineer desires to effect an emergency application of brakes, he will initiate at the locomotive a sudden emergency reduction in pressure in the brake pipe 5 in the usual manner. If the brake controlling valve device 1 is on the car next to the locomotive, the emergency piston 30 therein will respond to the reduction in the brake pipe pressure initiated by the engineer and move the auxiliary slide valve 39 relative to the main slide valve 35 to its service position above described in which ports 153 and 154 are in registry. The capacity of these ports is however insufficient to reduce the pressure in valve chamber 32 and quick action chamber 33 as fast as the brake pipe pressure is being reduced so that a sufficient differential of pressures will be promptly obtained on the emergency piston for moving same from service position to an emergency position at the right-hand end of the bore in which it operates. During this movement of the piston 30 the shoulder 37 at the left-hand end of the piston stem 38 will engage the main slide valve 35 so that movement of said piston to emergency position will also move said main slide valve to an emergency position.

At the time shoulder 37 on the piston stem 38 engages the main slide valve 35 the auxiliary slide valve 39 opens passage 156 to valve chamber 32. This passage at the seating face of the main slide valve registers with passage 101 leading to the vent valve piston chamber 100 so that when uncovered by the auxiliary slide valve a preliminary flow of fluid under pressure from valve chamber 32 and quick action chamber 33 to the vent valve piston chamber 100 will occur. When the main slide valve 35 is however moved to its emergency position passage 156 is opened past the end of said valve to chamber 32 to provide for further flow of fluid under pressure to the vent valve piston chamber 100.

The pressure of fluid thus obtained in chamber 100 on the vent valve piston 99 will effect movement of said piston in the direction of the right hand to move the brake pipe vent valve 91 out of contact with seat rib 94 so as to thereby open communication between the brake pipe passage 93 and chamber 95 which is open to the atmosphere through passage 96. Through this communication fluid under pressure will then be vented from the brake pipe at an emergency rate for causing the emergency valve device 9 on the next car in the train to the rear to operate in the same manner as above described and thus propagate the emergency action serially through the train in the well known manner.

Upon an emergency reduction in brake pipe pressure the service piston 18 will move the slide valves 24 and 28 to their service position in the same manner as in effecting a service application of brakes and then remain in this position to supply fluid under pressure from the auxiliary reservoir 2 to the application and release passage 71.

In emergency position of the emergency piston 30 and main slide valve 35, the passage 55 is lapped by said valve so as to prevent flow of fluid under pressure to volume 54 and chamber 52 at the left hand side of the delay valve piston 51 and at the same time as this occurs passage 144 connected to the emergency reservoir 3 is opened through cavity 150 in said valve to the application and release passage 71 whereby both the auxiliary and emergency reservoirs are placed in communication with said passage and thereby with passage 70 leading to check valve chamber 69 in the delay valve mechanism 50. Fluid under pressure thus supplied to the check valve chamber 69 from both the auxiliary and emergency reservoirs will then flow past check valve 72 through the relatively large opening 68 to chamber 63 and thence through passage 65 to the brake cylinder device 4 for initiating the emergency application of brakes.

At the same time as fluid is thus supplied to the brake cylinder device from chamber 63 fluid will also flow from said chamber through passage 64 to chamber 62 at the right hand face of the delay valve piston 51. Under this condition, chamber 52 at the opposite side of piston 51 is not supplied with fluid under pressure, as above mentioned, so that only the pressure of spring 56 on said piston will oppose the pressure of fluid in chamber 62 at the opposite side of the piston. The pressure of spring 56 is such that when the pressure of fluid obtained in chamber 62 and thereby in the brake cylinder device 4 is increased to a certain relatively low degree, such as 15 pounds, this pressure will move the piston 51 in the direction of the left-hand into engagement with a gasket 158 whereupon spring 73 will seat the check valve 72 so as to prevent further flow of fluid under pressure from chamber 69 through the relatively large opening 68 to the brake cylinder device 4 at the rate at which fluid is supplied to the brake application and release passage 71 by both the service and emergency application valve devices 8 and 9.

After the check valve 72 is seated as just described fluid under pressure supplied to chamber 69 from the service and emergency application valve devices will however continue to flow to the brake cylinder device 4 at a rapidly restricted rate by way of port 75 by-passing the check valve 72 so as to thereby provide for a continued but relatively slow increase in pressure in the brake cylinder device 4.

While fluid under pressure is being supplied to the brake cylinder device as just described, the pressure in the emergency valve chamber 32 and quick action chamber 33 is being gradually reduced to the atmosphere by way of the restricted port 102 through the vent valve piston 99, and as a consequence, the pressure in chamber 82 at the left-hand side of diaphragm 81 in the timing valve device 80 is also being correspondingly reduced. At the opposite side of diaphragm 81 the check valve 84 is at this time subject, in chamber 86, to the pressure of fluid effective in the brake application and release passage 71, and in chamber 87 out side of the seat rib 85 to the pressure of fluid effective in the brake cylinder device 4, and the parts of the timing valve device are so proportioned that after the pressure in the brake cylinder device has been increased to a certain degree by the relatively slow flow of fluid through the restricted port 75 the forces on the right-hand side of the diaphragm will over-balance that on the left-hand side and cause deflection of the diaphragm toward the left-hand for unseating the check valve 84. With the check valve 84 thus unseated the brake application and release passage 71 is connected through the choke 88 to the brake cylinder passage 65 and through this communication fluid under pressure will then flow to the brake cylinder device in addition to the supply through the restricted port 75 to thereby provide for an increase in the rate of the emergency application. The degree of pressure obtained in the brake cylinder device for effecting an emergency application of the brakes is limited to equalization with the pressures originally existing in the auxiliary reservoir 2 and emergency reservoir 3, as will be apparent.

From the above description it will now be noted that in effecting an emergency application of the brakes there is initially a limited rapid inshot of fluid under pressure to the brake cylinder device 4 past the open check valve 72 followed by a relative slow rate of supply governed by the flow capacity of the restricted port 75, and finally the rate of supply is increased through choke 88 upon unseating of the timing check valve 84.

The purpose of the initial limited but rapid inshot of fluid pressure to the brake cylinder device is to provide an application of brakes of such limited degree as to cause a gentle running in of the slack in a long freight train so as to avoid damage to any part of the train or wrecking thereof incident to slack gathering. The gradual supply to the brake cylinder by way of restricted port 75 then provides for a gradual increase in pressure in the brake cylinder device 4 to insure gentle gathering of the slack, and the final increase in rate provided by the restricted port 88 to the full emergency degree provides for prompt stopping of the train after the slack has been gathered. As before pointed out, the delaying of an emergency application of brakes on a long freight train as just described is required to insure that the train will be stopped without damaging same.

When, in effecting an emergency application of brakes, the brake pipe pressure becomes reduced to a chosen low degree, such as 30 pounds, the spring 128 in the limiting valve device 110 will seat the valve 121 against this low pressure acting in chamber 117 on the diaphragm 112 and thus disconnect the safety valve device 120 from the brake cylinder device. Since the emergency pressure obtained in long freight train operation does not however exceed the usual adjustment of the safety valve device for high speed short train service, this disconnecting of the safety valve device from the brake cylinder device in long freight train service serves no useful function except to prevent possible loss of fluid under pressure from the brake cylinder device in case the safety valve device should leak.

When in effecting an emergency application of brakes the pressure of fluid in the emergency valve chamber 32 and quick action chamber 33 is sufficiently reduced through the choke port 102 in the vent valve piston 99, the spring 97 acting on the vent valve 91 will seat said valve and return the piston 99 to the normal position shown to provide for recharging of the brake equipment for effecting a release of brakes after an emergency application, whenever such is desired. The volume of the valve chamber 32 and quick action chamber 33 are so related to the venting capacity of port 102 to the vent valve piston 99 however that the vent valve 91 will be held open for a sufficient period of time to insure complete venting of all fluid from the brake pipe 5 in long slow speed freight trains, to thereby insure an emergency application of the brakes throughout the whole train.

*Long train operation—release of brakes after an emergency application*

In order to effect a release of brakes after an emergency application, fluid under pressure is again supplied to the brake pipe 5 and thereby to the service piston chamber 19 and emergency piston chamber 31. The consequent increase in pressure in the service piston chamber 19 over the opposing reduced auxiliary reservoir pressure in valve chamber 22 will return the piston 18 and thereby the slide valves 24 and 28 to their normal release positions shown in which the brake cylinder device 4 is opened to the atmosphere as above described for effecting a release of the brakes and also in this position fluid under pressure is again supplied from the brake pipe to the valve chamber 22 and thence to the auxiliary reservoir 2 and emergency reservoir 3 for recharging same to the pressure in the brake pipe.

The increase in brake pipe pressure on the emergency piston 30 will return same and thereby the slide valve 39 and 35 to their normal positions shown in which the valve chamber 32 and quick action chamber 33 will be recharged with fluid at the pressure in the brake pipe. Upon this recharging of the emergency valve chamber 32 the corresponding increase in pressure in chamber 82 at the left-hand side of the timing diaphragm 81 will return the valve 84 into sealing contact with seat rib 85 and the pressure both inside and outside of said seat rib will be reduced to that of the atmosphere along with the venting of fluid under pressure from the brake cylinder device 4. In other words, the different parts of the brake controlling valve device 1 will now be conditioned identical to the positioning subsequent to initial charging of the equipment.

*Summary, long freight train operation*

From the above description it will now be noted that when a car provided with the brake controlling valve device is coupled in a long freight train said device will operate like the "AB" brake to provide, through the medium of the emergency delay valve mechanism 50, a controlled three stage increase in pressure in the brake cylinder device 4 in order to provide for gentle gathering of slack in the train in effecting an emergency application of brakes. It will also be noted that the safety valve device 120 does not interfere with or change the operation of the brake controlling valve device 1 in long freight train service in any way, so that the operation in both a service and an emergency application of brakes remains like that of the "AB" brake.

*Short train high speed service*

When a car equipped with the brake controlling valve device 1 is coupled into a short high speed freight or express train, the charging of the signal pipe on the train will provide fluid under pressure in chamber 134 of the quick application valve device 111. This pressure acting on the diaphragm 130 will deflect same and thereby the diaphragm 131 in the direction of the right-hand to unseat the check valve 135 and said check valve will remain in this condition during all operation of the train. The opening of check valve 135 connects the brake application and release passage 71 through passage 137, chambers 136 and 124, and passage 125 to the brake cylinder passage 55 thereby opening a bypass around the restricted port 75 in the emergency delay valve mechanism 50 and the restricted port 88 in the timing valve device 80. As a result, when an emergency application of brake is effected fluid under pressure will be supplied to the brake cylinder device 4 past the check valve 135 at the relatively rapid rate desired in high speed short train operation to ensure prompt stopping of the train; the emergency delay valve mechanism 50 being thus rendered ineffective to limit the rate of supply of fluid to the brake cylinder device although it will operate in high speed train operation in the same manner as in long freight train service as above described.

In high speed train operation the brake pipe pressure in chamber 117 of the limiting valve device 110 will hold the check valve 121 open at all times except when the brake pipe pressure is reduced to a chosen low degree, as in excess of a full service reduction and as occurs upon an emergency reduction in brake pipe pressure. As a result, the safety valve device 120 will be effective to limit to the desired degree the pressure obtained in the brake cylinder device 4 upon a full service reduction in brake pipe pressure, in the usual manner. When an emergency reduction in brake pipe pressure is effected, however, the corresponding venting of fluid under pressure from diaphragm chamber 117 will permit brake cylinder pressure and the pressure of spring 128 in chamber 122 acting on the check valve 121 to seat said check valve and thereby disconnect the safety valve device 120 from the brake cylinder device 4 so as to render the safety valve device ineffective and provide for obtaining in the brake cylinder device 4 the usual high emergency pressure required for prompt stopping of the train in high speed service.

*Summary*

It will now be noted that the addition of the filler member 10 and changeover valve device 11 to an "AB" brake, such as disclosed in the aforementioned Farmer's patent, provides for use of this brake on cars which are required to operate in both long train freight service and high speed relative short freight train or express service. In the long train freight service the brake is arranged to operate in harmony with other brakes in the train due to the lack of signal pipe pressure in such service, while in the short train high speed service the presence of signal pipe pressure automatically conditions the changeover valve device 10 to provide for operation of the brake in harmony with brakes specifically designed for such service. It should be noted that the objects of the invention are obtained merely by the addition of the filling member 10 and changeover device 11 to an "AB" brake without any change in said brake and that said device is automatically adjustable to the different types of service without attention on the part of a trainman.

Having now described the invention what I claim as new and desire to secure by Letters Patent is:

1. In the fluid pressure brake, in combination, a brake pipe, a brake cylinder device, a brake controlling valve device operative upon either a service or an emergency reduction in the pressure of fluid in said brake pipe to supply fluid under pressure to said brake cylinder device to effect an application of the brakes, a safety valve device operative to limit the pressure of fluid in said brake cylinder device, a spring, and means controlled by the opposing pressures of fluid in said brake pipe and of said spring for controlling communication between said brake cylinder device and safety valve device and operative by said spring upon an emergency reduction in brake pipe pressure to close said communication and operative by brake pipe pressure at all other times to open said communication.

2. In the fluid pressure brake, in combination, a brake pipe, a brake cylinder device, a brake controlling valve device operative upon either a service or an emergency reduction in the pressure of fluid in said brake pipe to supply fluid under pressure to said brake cylinder device to effect an application of the brakes, a safety valve device operative to limit the pressure of fluid in said brake cylinder device, a spring, and means controlled by the opposing pressures of fluid in said brake pipe and of said spring for controlling communication between said brake cylinder device and safety valve device, said means being operable by brake pipe pressure when of a degree exceeding substantially that following a full service reduction in brake pipe pressure to open said communication and when of a lesser degree being operable to close said communication under the action of said spring.

3. In the fluid pressure brake, in combination, a brake pipe, a brake cylinder device, a brake controlling valve device operative upon either a service or an emergency reduction in the pressure of fluid in said brake pipe to supply fluid under pressure to said brake cylinder device to effect an application of the brakes, a safety valve device operative to limit the pressure of fluid in said brake cylinder device, a spring, and means controlled by brake pipe pressure and the opposing pressure of said spring and the pressure of fluid in said brake cylinder device and operative by brake pipe pressure when exceeding a certain degree to open said communication and operative by said opposing pressures when the brake pipe pressure is less than said certain degree to close said communication.

4. In the fluid pressure brake, in combination, a brake pipe, a brake cylinder device, a brake controlling valve device operative upon either a service or an emergency reduction in the pressure of fluid in said brake pipe to supply fluid under pressure to said brake cylinder device to effect an application of the brakes, a safety valve device operative to limit the pressure of fluid in said brake cylinder device, a valve controlling communication between said brake cylinder device and safety valve device, movable abutment means subject to the opposing pressures of fluid in said brake pipe and of fluid in said communication on the safety valve side of said valve and operative by brake pipe pressure when exceeding a certain degree to open said communication, and spring means operative to actuate said valve to close said communication upon a reduction in brake pipe pressure to a degree below said certain degree.

5. In a fluid pressure brake, in combination, a brake pipe, a brake cylinder device, a brake controlling valve device operative upon either a service or an emergency reduction in the pressure of fluid in said brake pipe to supply fluid under pressure to said brake cylinder device to effect an application of brakes, a safety valve device operative to limit the pressure of fluid in said brake cylinder device, a first chamber connected to said safety valve device, a second chamber open to said brake cylinder device, a check valve in said second chamber controlling communication between the two chambers, movable abutment means connected to said check valve and subject to the opposing pressures of fluid in said brake pipe and of fluid in said first chamber and operative by brake pipe pressure when exceeding a certain degree to operate said check valve to open said communication, and means arranged to operate said check valve to close said communication upon a reduction in pressure in said brake pipe to a degree below said certain degree.

6. In a fluid pressure brake, in combination, a brake pipe, a brake cylinder device, a brake controlling valve device operative upon either a service or an emergency reduction in the pressure of fluid on said brake pipe to supply fluid under pressure to said brake cylinder device to effect an application of brakes, a safety valve device operative to limit the pressure of fluid in said brake cylinder device, a first chamber connected to said safety valve device, a second chamber open to said brake cylinder device, a check valve in said second chamber controlling communication between the two chambers, two flexible diaphragms of different areas connected together and to said check valve, the larger diaphragm being subject on its outer face to brake pipe pressure and the smaller diaphragm being subject on its outer face to the pressure of fluid in the first named chamber, said diaphragms cooperating to unseat said check valve under the influence of brake pipe pressure on the larger diaphragm when the pressure of fluid in said brake pipe exceeds a certain degree, and means operative to seat said check valve for closing said communication upon a reduction in pressure in said brake pipe below said certain degree.

7. In a fluid pressure brake, in combination, a brake pipe, a signal pipe, a brake cylinder device, a brake controlling valve device operative upon a reduction in brake pipe pressure to supply fluid under pressure to said brake cylinder device to effect an application of brakes, delay means operative to retard said supply of fluid under pressure to said brake cylinder device, and means controlled by the opposing pressures of fluid in said signal pipe and of fluid supplied to effect an application of brakes and operative when said signal pipe is charged with fluid under pressure to open a by-pass around said delay means to provide for an increased rate of flow of fluid under pressure from said brake controlling valve device to said brake cylinder device, said means being operative when said signal pipe is not charged with fluid under pressure to close said by-pass.

8. In a fluid pressure brake, in combination, a brake pipe, a signal pipe, a brake cylinder device, a brake controlling valve device operative upon a reduction in brake pipe pressure to supply fluid under pressure to said brake cylinder device to effect an application of brakes, delay means operative to retard said supply of fluid under pressure to said brake cylinder device, valve means controlling a by-pass around said delay means to provide for an increased rate of supply of fluid under pressure from said brake controlling valve device to said brake cylinder means, a spring, and means for controlling said valve means controlled by pressure of fluid in said signal pipe and the opposing pressures of said spring and of fluid supplied to effect an application of brakes and operative with said signal pipe charged with fluid under pressure to actuate said valve means to open said by-pass and when said signal pipe is void of fluid under pressure to actuate said valve means to close said by-pass.

9. In a fluid pressure brake, in combination, in brake pipe, a signal pipe, a brake cylinder device, a brake controlling valve device operative upon a reduction in brake pipe pressure to supply fluid under pressure to a communication for supplyy to said brake cylinder device to effect an application of brakes, delay means operative to retard the flow of fluid under pressure from said communication to said brake cylinder device, and valve means for rendering said delay means either effective or ineffective comprising a casing having one chamber open to said communication and a second chamber open to said brake cylinder device, a valve in said one chamber controlling communication between the two chambers and operative when open to provide for flow of fluid under pressure from said brake controlling valve device to said brake cylinder means at a more rapid rate than provided by said delay means, a spring acting on said valve to close same and thereby communicate between said chambers, and movable abutment means connected to said valve and open at one side to said signal pipe, said movable abutment means being operable when said signal pipe is charged with fluid under pressure to open said valve and providing for closure of said valve by said spring when said signal pipe is void of fluid under pressure, said abutment means being also subject to the pressure of fluid in said second chamber acting in opposition to signal pipe pressure.

10. In a fluid pressure brake, in combination, in brake pipe, a signal pipe, a brake cylinder device, a brake controlling valve device operative upon a reduction in brake pipe pressure to supply fluid under pressure to a communication for supply to said brake cylinder device to effect an application of brakes, delay means operative to retard the flow of fluid under pressure from said communications to said brake cylinder device, and valve means for rendering said delay means either effective or ineffective comprising a casing having one chamber open to said communication and a second chamber open to said brake cylinder device, a valve in said one chamber controlling communication between the two chambers and operative when open to provide for flow of fluid under pressure from said brake controlling valve device to said brake cylinder means at a more rapid rate than provided by said delay means, a relatively small diaphragm subject on one face to pressure of fluid in the second named chamber and having an operating connection with said valve, a relatively large diaphragm operatively connected to said small diaphragm and subject on its opposite face to pressure of fluid in said signal pipe, said diaphragms cooperating when said signal pipe is charged with fluid under pressure to open said valve and when said signal pipe is void of fluid pressure to provide for seating of said valve, and a spring in the first named chamber acting on said valve for urging same to its closed position.

11. In a fluid pressure brake, in combination, a brake pipe, a signal pipe, a brake cylinder device, a brake controlling valve device operative upon both a service and an emergency reduction in brake pipe pressure to supply fluid under pressure to said brake cylinder device for effecting either a service or an emergency, respectively, application of brakes, delay means arranged to control flow of fluid under pressure from said brake controlling valve device to said brake cylinder device and operative upon an emergency reduction in brake pipe pressure to retard such flow and upon a service reduction in brake pipe pressure to provide for more rapid flow, valve means controlling a by-pass around said delay means through which fluid under pressure may flow to said brake cylinder device at a more rapid rate than provided by said delay means upon an emergency reduction in brake pipe pressure, said valve means being controlled by pressure of fluid in said signal pipe and an opposing pressure and being operative when said signal pipe is charged with fluid under pressure to open said by-pass and when said signal pipe is void of fluid pressure to close said by-pass, a safety valve device, a spring, and valve means controlled by the opposing pressures of said spring and of fluid in said brake pipe controlling a communication between said brake cylinder device and safety valve device and operative by brake pipe pressure when above a certain degree to connect said brake cylinder device to said safety valve device and operative by said spring when the brake pipe pressure is of a lower degree to close communication between said brake cylinder device and safety valve device.

12. In combination, a brake pipe, a signal pipe, a brake cylinder device, an "AB" brake comprising a pipe bracket, a service application valve device mounted on one face of said bracket and arranged to operate upon both a service and an emergency reduction in pressure in said brake pipe to supply fluid under pressure to said brake cylinder device for effecting an application of brakes, and further comprising an emergency application valve device associated with an opposite face of said bracket and arranged to operate upon an emergency reduction in pressure in said brake pipe to also supply fluid under pressure to said brake cylinder device, said emergency application valve device also comprising a delay valve device controlling communication between said brake cylinder device, and said service and emergency application valve devices through which fluid under pressure is supplied therefrom to said brake cylinder device, said delay valve device being controlled by said emergency valve device and conditionable thereby upon an emergency reduction in brake pipe pressure to retard flow of fluid under pressure through said communication and upon a service reduction in brake pipe pressure to provide for a faster rate of flow of fluid under pressure through said communication to said brake cylinder device, a changeover valve device interposed between said pipe bracket and emergency valve device having one chamber connected ahead of said delay means to the communication through which fluid under pressure is arranged for supply from said service and emergency application valve devices to said brake cylinder device and having a second chamber open to said brake cylinder device, a valve in said one chamber controlling communication between the two chambers and operative when open to provide a by-pass around said delay means for flow of fluid under pressure to said brake cylinder device at a more rapid rate than provided by said delay means upon an emergency reduction in brake pipe pressure, movable abutment means subject to the opposing pressures of fluid in said signal pipe and in said second chamber and operative when said signal pipe is charged with fluid under pressure to open said valve and thereby said by-pass and when said signal pipe is void of fluid pressure to provide for closing of said valve and thereby said by-pass, a spring in said first chamber acting on said valve for urging same to its closed position, said changeover valve device further comprising a third chamber open to said second chamber and thereby said brake cylinder device, and a fourth chamber, a safety valve device connected to said fourth chamber, a valve in said third chamber controlling communication between same and said fourth chamber, and movable abutment means subject to the opposing pressures of fluid in said fourth chamber and in said brake pipe operative with said brake pipe charged with fluid at a pressure above a certain chosen degree to actuate the last named valve for opening communication between said third and fourth chambers to thereby connect said brake cylinder device to said safety valve device, and a spring acting on the last named valve for closing same when the brake pipe pressure acting on the last named abutment means is below said certain degree.

GLENN T. McCLURE.